United States Patent [19]

Aune et al.

[11] Patent Number: 5,188,658
[45] Date of Patent: Feb. 23, 1993

[54] METHOD FOR RECOVERING ZINC FROM ZINC-CONTAINING WASTE MATERIALS

[75] Inventors: Jan A. Aune, Enebakk; Inger J. Eikeland; Thor Pedersen, both of Oslo, all of Norway

[73] Assignee: Elkem Technology A/S, Kingdom, Norway

[21] Appl. No.: 628,573

[22] Filed: Dec. 14, 1990

[30] Foreign Application Priority Data

Dec. 22, 1989 [NO] Norway ................. 895250

[51] Int. Cl.$^5$ ............................. C22B 4/02
[52] U.S. Cl. ................................. 75/10.31
[58] Field of Search ........................ 75/10.31

[56] References Cited

U.S. PATENT DOCUMENTS

| | | | |
|---|---|---|---|
| 2,920,951 | 1/1960 | Bretschneider | 75/10.31 |
| 3,262,771 | 7/1966 | Ban | 75/10.31 |
| 3,346,364 | 10/1967 | Warnes | 75/10.31 |
| 4,323,391 | 4/1982 | Honda | 75/10.31 |

FOREIGN PATENT DOCUMENTS 678064 8/1952 United Kingdom .

Primary Examiner—Peter D. Rosenberg
Attorney, Agent, or Firm—Lucas & Just

[57] ABSTRACT

The present invention relates to a method for recovering zinc from zinc-containing materials, especially from zinc-containing materials recovered from waste gases in metallurgical smelting processes. Particulate zinc-containing materials are agglomerated together with a carbonaceous reduction material and optionally slag forming materials, and are supplied to a gas tight closed electrothermic smelting furnace containing a molten bath kept at a temperature between 1200° and 1700° C. in which the agglomerates are smelted and subjected to selective reduction and volatilization of zinc and other volatile metals. An inert slag phase and optionally a liquid metal phase are tapped from the smelting furnace, and zinc and other volatile metals are recovered from the waste gas from the smelting furnace by condensation. In order to prevent reoxidation of metallic zinc the particulate zinc-containing materials are agglomerated together with a carbonaceous binder which cracks at a temperature below 700° C. and forms carbon black, and that the temperature in the gas atmosphere in the smelting furnace is kept above 1000° C. in order to maintain a volume ratio between $CO_2$ and $CO$ in the gas atmosphere in the smelting furnaces below 0.3.

20 Claims, 1 Drawing Sheet

METHOD FOR RECOVERING ZINC FROM ZINC-CONTAINING WASTE MATERIALS

The present invention relates to a method for recovering zinc from waste materials such as for example dust recovered from waste gases in metallurgical processes such as steel production, but it can also be used for recovering zinc from ores, concentrates and other zinc-containing materials.

The dust which is recovered from waste gases in steel production is hereinafter called EAF-dust, which is an abbreviation of Electric Arc Furnace Dust. The dust is precipitated from the waste gases in filter systems, as for instance bagfilters or other known filter systems. The particle size of the primary particles is usually within the range of 0.1 to 10 $\mu$m, but the primary particles are often partly agglomerated to somewhat greater particles. The EAF dust consists of complex oxides formed during the smelting- and refining processes as for instance oxides of Fe, Zn, Pb, Cd, Mn, Ni, Cu, Mo and other elements which are present in scrap iron.

The following table 1 shows the chemical analysis of EAF-dust from four different steel producers. As can be seen iron oxides constitute the greater part, but the content of zinc oxide is also rather high. EAF-dust is a waste product which creates big problems and which up to recently has been impossible to dispose of or to utilize. Some of the oxides contained in the EAF dust are leachable in water and by deposition of EAF dust in landfills these oxides may in the course of time be leached from the dust and can result in serious pollution of the environment.

A number of different methods for transferring EAF dust to such a form that it can be deposited without danger have been proposed. These methods do, however, not aim at recovering valuable compounds in the dust. According to Norwegian patent No. 160931 (U.S. Pat. No. 4,957,551) the dust is transferred to a form which makes it possible to deposit the product without any danger of pollution of the environment. In this process the dust is treated in a closed electrothermal smelting furnace in a multi-step process which also comprises selective reduction and volatilization of volatile metals. According to the Norwegian patent zinc can be recovered by condensation. It has, however, been found that the yield of the zinc recovery in the condensation step is comparatively low due to the fact that a part of the volatilized zinc is reoxidised to zinc oxide in the gas atmosphere in the smelting furnace and in the zinc condenser.

TABLE 1

| | Composition of EAF dust in % of weight | | | |
|---|---|---|---|---|
| | Dust A | Dust B | Dust C | Dust D |
| $Fe_2O_3$ | 45,0 | 56,1 | 43,0 | 53,5 |
| ZnO | 28,3 | 13,2 | 18,4 | 53,5 |
| CdO | 0,12 | 0,03 | 0,01 | 0,01 |
| AgO | 0,01 | — | — | — |
| $MoO_3$ | 0,09 | 0,09 | 0,09 | 0,09 |
| PbO | 3,39 | 1,36 | 2,23 | 1,51 |
| $As_2O_3$ | 0,01 | — | 0,01 | 0,006 |
| $Cr_2O_3$ | 0,16 | 0,22 | 0,18 | 0,19 |
| $V_2O_5$ | 0,02 | 0,04 | 0,03 | 0,04 |
| $TiO_2$ | 0,04 | 0,09 | 0,08 | 0,08 |
| BaO | — | 0,03 | — | — |
| CaO | 4,81 | 10,42 | 15,19 | 10,14 |
| $Sb_2O_3$ | 0,03 | 0,01 | — | 0,01 |
| $SiO_2$ | 3,0 | 3,3 | 2,0 | 2,1 |
| $SO_4$ | 1,52 | 1,18 | 2,12 | 2,14 |
| Cl | 1,94 | 1,44 | 0,21 | 1,31 |

TABLE 1-continued

| | Composition of EAF dust in % of weight | | | |
|---|---|---|---|---|
| | Dust A | Dust B | Dust C | Dust D |
| $Na_2O$ | 2,21 | 1,25 | 3,41 | 2,76 |
| MgO | 3,31 | 2,50 | 2,80 | 3,42 |
| F | 0,19 | 1,39 | 0,55 | 0,46 |
| CuO | 0,37 | 0,18 | 0,17 | 0,23 |
| NiO | 0,04 | 0,03 | 0,02 | 0,03 |
| CoO | 0,03 | 0,03 | 0,02 | 0,03 |
| MnO | 4,72 | 6,33 | 4,33 | 5,08 |
| $SnO_2$ | 0,05 | 0,10 | 0,03 | 0,04 |
| $K_2O$ | 1,4 | 0,6 | 1,3 | 1,3 |
| $P_2O_5$ | 0,17 | 0,24 | 0,17 | 0,20 |
| $Al_2O_3$ | 0,45 | 0,86 | 0,38 | 0,31 |
| Total: | 101,38 | 101,02 | 97,25 | 98,08 |

The main reason for the reoxidation of zinc which occurs in the method according to Norwegian patent No. 160931 (U.S. Pat. No. 4,957,551) is thought to be that due to partial reduction of iron oxides present in the supplied EAF dust, the $CO_2$ content in the gas atmosphere in the smelting furnace and in the channel between the smelting furnace and the condenser, will be so high that the zinc vapour reacts with $CO_2$ to form ZnO and CO. The yield of zinc in form of metallic zinc recovered in the zinc condensator can therefore according to the method of Norwegian patent No. 160931 (U.S. Pat. No. 4,957,551) be as low as 55%.

It is an object of the present invention to provide a method whereby the yield of recovered zinc can be substantially increased over the known state of the art.

Accordingly, the present invention relates to a method for recovering zinc from zinc-containing materials, especially from zinc-containing materials recovered from waste gases in metallurgical smelting processes, where particulate zinc-containing materials are agglomerated together with a carbonaceous reduction material and optionally slag forming materials, said agglomerates being supplied to a gas tight closed electrothermic smelting furnace containing a molten bath kept at a temperature between 1200° and 1700° C. in which the agglomerates are smelted and subjected to selective reduction and volatilization of zinc and other volatile metals, tapping of an inert slag phase and optionally a liquid metal phase from the smelting furnace, and recovering zinc and other volatile metals from the waste gas from the smelting furnace by condensation, the improvement consisting of agglomerating the particulate zinc-containing materials together with a carbonaceous binder which cracks at a temperature below 700° C. and forms carbon black, and that the temperature in the gas atmosphere in the smelting furnace is kept above 1000° C. in order to maintain a volume ratio between $CO_2$ and CO in the gas atmosphere in the smelting furnaces below 0.3.

The temperature in the gas atmosphere is preferably maintained above 1000° C. by heat radiation from the surface of the smelting bath. Preferably the supply of agglomerates to the smelting bath is regulated in such a way that 5 to 50% of the surface area of smelting bath is kept open and uncovered by agglomerates.

The temperature in the gas atmosphere can further be increased by blowing oxygen or oxygen enriched air into the gas atmosphere in the smelting furnace in an amount less than the stochiometric amount necessary for combustion of the carbon black formed during cracking of the carbonaceous binder in the agglomerates.

According to a preferred embodiment the temperature in the gas atmosphere in the smelting furnace is maintained between 1100° and 1300° C. and the volume ratio between $CO_2$ and CO in the gas atmosphere in the smelting furnace is maintained between 0.05 and 0.15.

As examples of carbonaceous binders which can be used in the method of the present invention, can be mentioned resins containing minimum 50% by weight of carbon, such as tall oil pitch, petrol pitch etc. According to a preferred embodiment of the present invention it is used tall oil pitch in an amount of 4–8% based on the weight of the agglomerates. It is thereby achieved agglomerates which have sufficient strength for ordinary transport in a smelting plant and which by heating of the agglomerates in the smelting furnace, produces enough carbon black in order to keep the volume ratio between $CO_2$ and CO in the gas atmosphere in the smelting furnace at a sufficiently low level. Best results are obtained by using agglomerates containing 6 to 7.5% tall oil pitch.

By the method according to the present invention the agglomerates will, when they are charged to the smelting furnace, float on the smelting bath. The agglomerates are heated and while they still are in solid form, the carbonaceous binder in the agglomerates will be cracked and carbon black, $H_2$ and $CH_4$ will be formed. The volatile cracking products together with part of the produced carbon black will escape from the agglomerates to the gas atmosphere above the smelting bath. In the gas atmosphere at least a part of the carbon black will react with $CO_2$ which evolves during reduction of the metal oxides in the agglomerates, and form CO. The reaction between carbon black and $CO_2$ to form CO increases with increasing gas temperature, and at a gas temperature above 1000° C. the volume ratio between $CO_2$ and CO can be kept so low that only a very small part of the zinc fume in the gas atmosphere will reoxidize to ZnO. In order to ensure a sufficient energy or temperature in the gas atmosphere and thereby achieve a best possible yield of the reaction between carbon black and $CO_2$ and for further increasing the temperature in the gas atmosphere, it is preferred to supply a controlled amount of oxygen or oxygen enriched air to the gas atmosphere in order to combust a part of the carbon black.

The part of the carbon black which is produced during cracking of the carbonaceous binder and which does not escape to the gas atmosphere, will immediately act to reduce oxides in the agglomerates and this reducing effect is adding to the reducing effect of the carbon containing reduction material present in the agglomerates. By using binders as described above, it is thus obtained an extra effect which is not possible to obtain by using conventional binders such as bentonite etc. This also means that the amount of carbon containing reducing materials in the agglomerates can be reduced.

As mentioned above, the agglomerates may contain slag forming materials. As slag forming materials it is preferably used $SiO_2$-sand, and the amount is adjusted in such a way that it is produced a slag having a sufficient low viscosity that it can be tapped from the furnace. Wet dust is optionally dried before it is agglomerated. The agglomerates can favorably be preheated to a temperature below the cracking temperature for the binder, before they are supplied to the smelting furnace.

BRIEF DESCRIPTION OF DRAWING

One embodiment of the present invention will now be further described with reference to the accompanying drawing, which shows an example of equipment for carrying out the invention.

On the figure reference numeral 1 shows a gas tight electrothermic smelting furnace. The furnace can be of any conventional type, but it is preferred to use an electrothermic smelting furnace having a circular cross-section equipped with three carbon electrodes extending through the furnace roof in an absolutely gas tight way. On the figure it is only shown one such electrode 2. The agglomerated raw materials containing a carbonaceous binder which cracks at a temperature below 700° C., are supplied to the furnace in a gas tight way via a silo 3 and charging tubes 4 in such a way and in so many places that the charge will float on the molten bath in the furnace and cover such a part of the surface area of the molten bath that 5-50% of the surface of the molten bath remains uncovered by the charge. The charging tubes 4 can be arranged along the periphery of the furnace, about the electrodes, or centrally in the furnace. The supplied agglomerates are heated in the furnace and melt at temperatures of 1200°–1700° C., normally between 1300° and 1400° C. During reduction of the oxides it is formed a slag phase and a metal phase containing mainly iron, copper and nickel together with minor amounts of other metals present in the EAF dust. The easily reducible and volatile elements, zinc and cadmium and partly lead are reduced and volatilized. If chlorides are present they will also be volatilized together with sulphur compounds and fluorides.

Figure 1:
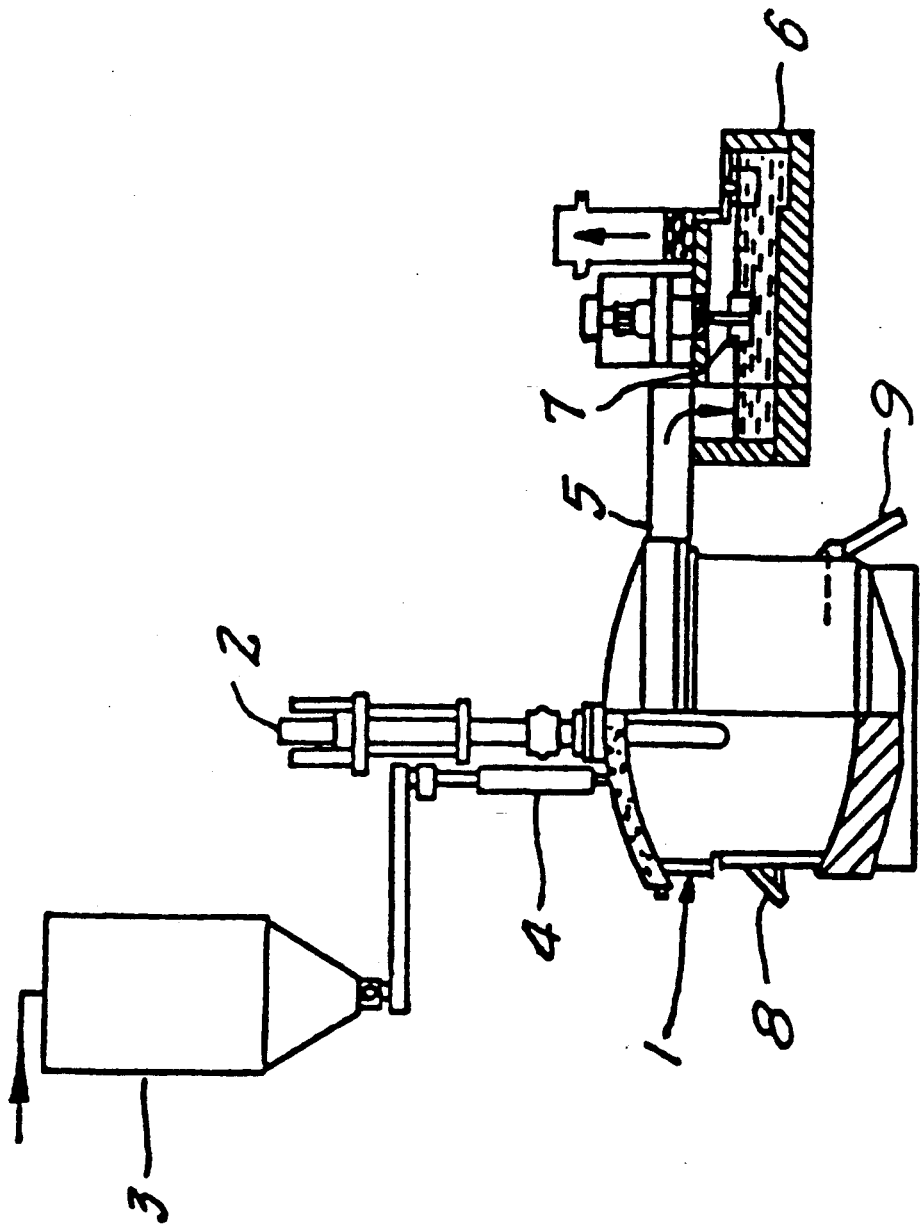

The gases which are formed in the smelting furnace are forwarded to a condenser 6 through a pipe 5. In the condenser 6, which can be of any conventional design, the volatilized zince is condensed in a bath of molten zinc. If necessary a mechanical agitator 7 can be used to stir the bath. During contact with the molten zinc bath the volatilized zinc will be condensed and accumulated in the zinc bath.

Molten zinc is continuously removed from the condenser in known way. Minor amounts of zinc chloride, cadmium chloride and lead chloride which may be present in the gas phase, will also be condensed in the condenser. These compounds will form a dross floating on the top of the zinc bath which is removed from time to time.

The remaining gas phase is optionally forwarded to an after-burner before any dust and other harmful components are removed from the gas in conventional ways.

As mentioned above a slag phase is formed in the smelting furnace. Below the slag phase there will exist a metallic phase containing iron, copper, nickel and minor amounts of other metals. The slag phase and the metallic phase are tapped from the furance through two different tapping holes 8 and 9. A part of the lead oxide will be reduced to metallic lead in the smelting furnace and will accumulate in a separate metallic lead phase near the bottom of the furnace below the iron-containing phase. This lead is at intervals tapped through a tapping hole in the furnace bottom. By the method according to the present invention it has been obtained a yield of metallic zinc of more than 98% of the zinc which is volatilized from the agglomerates.

EXAMPLE 1

A mixture of 87% EAF dust containing as main components 42.2% $Fe_2O_3$, 17.6% ZnO and 2.8% PbO, 8% silica sand (91% SiO2) and 5% coke breeze (87% C) was briquetted under addition of 7% tall oil pitch (79% C, 4% H and 15% O).

The briquettes were supplied to a lab scale smelting furnace having a freeze lining in its lower part. The furnace was equipped with two graphite electrodes. The temperature of the smelting bath in the furnace was adjusted to about 1400° C. The supplied briquettes which covered about 20% of the surface area of the smelting bath, was melted and formed a slag phase having a temperature between 1300° and 1380° C. The temperature in the furnace space above the molten bath was kept between 1110° and 1270° C. by radiation heat from the uncovered part of the smelting bath. During the smelting of the briquettes the iron oxides were mainly reduced to FeO which entered into the slag phase, while a minor amount was further reduced to metallic iron. Zinc-and lead oxide were reduced to metallic state and volatilized.

Samples of the gas phase in the furnace were drawn by means of a water cooled lance and were continuously analyzed to monitor its content of CO and $CO_2$. The volume ration $CO_2/CO$ was found to be within the range 0.1 to 0.2. A typical gas analysis showed 59.5 CO, 6.1% $CO_2$, 31.7% $H_2$, 1.2% $CH_4$ and 0.8% $N_2$. The off-gas from the furnace was forwarded to a zinc condenser containing liquid zinc operating at a temperature of 550° C. The volatilized zinc and lead in the gas phase were condensed in the condenser.

After the test was finished it was found an amount of metallic zinc in the condenser corresponding to 82% of zinc supplied to the furnace. In addition it was found an amount of zinc oxide corresponding to 5% of supplied zinc. Of the volatilized zinc it was thus recovered 94.2% as metallic zinc. The produced slag contained an amount of zinc corresponding to 10% of the zinc supplied to the furnace. The slag contained 2.5% ZnO and 47.4% FeO.

EXAMPLE 2

A mixture of 87% EAF dust containing as main components 46.5% $Fe_2O_3$, 23.0% ZnO and 2.3% PbO, 8% silica sand (99% SiO2) and 10% coke was briquetted under addition of 7% tall oil pitch.

The briquettes were supplied to the same smelting furnace as described in example 1 and the same temperature conditions were maintained in the furnace. The volume ratio $CO_2/CO$ was again found to be in the interval 0.1 to 0.2. A typical gas analysis showed 78.9% CO, 7.9% $CO_2$, 11.2% $H_2$, 1.0% $CH_4$ and 0.7% $N_2$.

Zinc and lead were condensed in the zinc condenser and it was after the test run found metallic zinc corresponding to 83% of the zinc supplied to the smelting furnace and zinc oxide corresponding to 5% of the zinc supplied to the smelting furnace of the volatilized zinc 94.3% was thus recovered as metallic zinc. In the slag it was found an amount of zinc corresponding to 8% of zinc supplied to the smelting furnace. The slag contained 2.6% ZnO and 49.2% FeO.

COMPARISON EXAMPLE

A mixture of 87% EAF dust of the same composition as in example 1, 8% silica sand (91% SiO2) and 5% coke breeze (87% C) was briquetted during addition of 7% bentonite (66% SiO2, 28% $Al_2O_3$, 5% $H_2O$) as a binder and about 20% water.

As test smelting under the same conditions as in example 1 and 2 was run. The volume ratio $CO_2/CO$ was now found to be in the interval between 0.4 and 0.7 and a typical gas analysis showed 36.4% CO, 17.8% $CO_2$, 42.5% $H_2$, 1.7% $CH_4$ and 1.2% $N_2$.

Zinc and lead were condensed in the zinc condenser. It was found metallic zinc corresponding to 48% of the zinc supplied to the smelting furnace and zinc oxide corresponding to 41% of the zinc supplied to the smelting furnace. In the slag it was found an amount of zinc corresponding to 10% of the zinc supplied to the smelting furnace. The slag contained 2.5% zinc and 47.1% FeO.

As is evident from this comparison example where it was used a binder which did not contain carbon compounds which can be cracked, only 54% of the volatized zinc was recovered as metallic zinc. Thus as much as 46% of the volatilized zinc was reoxidized to ZnO.

The examples thus show that by the method of the present invention, it is obtained a very high reduction in the amount of zinc which reoxidizes to zinc oxide in the gas atmosphere. The increased yield of recovered metallic zinc gives a strongly improved economy in the method for treating EAF dust, and further makes it possible to treat a number of other zinc-containing waste products and ores in an economically viable way.

What is claimed

1. In a process for treating zinc containing materials with a carbonaceous reducing material in a gas tight closed electrothermic smelting furnace wherein said furnace has a molten bath of metal at a temperature between 1200° to 1700° C. so as to produce an inert slag phase, a liquid metal phase and a gas phase containing zinc wherein said zinc is recovered by means of condensation, the improvement comprising:
   agglomerating said zinc containing material with a carbonaceous binder which, at a temperature below 700° C., cracks to form carbon black; and maintaining a volume ratio of $CO_2:CO$ in the gas phase in said furnace at below 0.3.

2. The process according to claim 1 wherein the volume ratio between $CO_2$ and CO in the gas atmosphere is in the smelting furnace is maintained between 0.05 and 0.15.

3. The process according to claim 1 wherein the temperature in the gas atmosphere maintained above 1000° C. by heat radiation from the surface of the smelting bath by regulating the supply of agglomerates to the smelting bath in such a way that 5 to 50% of the surface area of smelting bath is kept open and uncovered by agglomerates.

4. The process according to claim 1 wherein the temperature in the gas atmosphere in the smelting furnace is kept between 1100° and 1300° C.

5. The process according to claim 1 wherein the temperature in the gas atmosphere is regulated by blowing oxygen or oxygen enriched air into the gas atmosphere in the smelting furnace in an amount less than the stochiometric amount necessary for combustion of the carbon black formed during cracking of the carbonaceous binder in the agglomerates.

6. The process according to claim 1 wherein tall oil pitch is used as carbonaceous binder in an amount of 4-8% based on the weight of agglomerates.

7. The process according to claim 6, wherein tall oil pitch is used in an amount of 6 to 7.5% based on the weight of agglomerates.

8. The process according to claim 3, wherein the agglomerates are supplied to the furnace through charging tubes arranged along the periphery of the furnace.

9. The process according to claim 3, wherein the agglomerates are supplied through charging tubes arranged about the electrode.

10. The process according to claim 3, wherein the agglomerates are supplied in the center of the furnace.

11. The process according to claim 1 wherein the agglomerates are preheated to a temperature below the cracking temperature for the carbonaceous binder before the agglomerates are supplied to the smelting furnace.

12. The process according to claim 2, wherein the temperature in the gas atmosphere in the smelting furnace is kept between 1100° and 1300° C.

13. The process according to claim 3, wherein the temperature in the gas atmosphere in the smelting furnace is kept between 1100° and 1300° C.

14. The process of claim 1 wherein the zinc containing material is dust collected from waste gas of a metallurgical smelting process.

15. The process of claim 1 wherein said zinc containing material is agglomerated with carbonaceous reducing material and slag forming materials.

16. In a process for treating zinc containing materials with a carbonaceous reducing material in a gas tight closed electrothermic smelting furnace wherein said furnace has a molten bath of metal at a temperature between 1200° to 1700° C. so as to produce an inert slag phase, a liquid metal phase and a gas phase containing zinc wherein said zinc is recovered by means of condensation, the improvement comprising:

maintaining a volume ratio of $CO_2:CO$ in the gas phase in said furnace at below 0.3 so as to reduce the reoxidation of vaporous zinc to zinc oxide and allow recovery of zinc in a substantially metallic form.

17. The process of claim 16 wherein the gas phase above the molten bath is maintained at a temperature above 1000° C.

18. The process of claim 17 wherein the carbonaceous reducing material is a carbonaceous binder which cracks to form carbon black at a temperature below about 700° C.

19. A process for recovering metallic zinc from dust obtained from waste gas of a furnace comprising the steps of:

(a) agglomerating dust from waste gas of a furnace wherein said dust contains zinc, with a carbonaceous binder, said binder forming carbon black at a temperature below 700° C., and containing at least 50% by weight carbon;

(b) heating said agglomerated dust in a gas tight electrothermic smelting furnace to a temperature of 1200° to 1700° C. to form a melt, and an atmosphere above the melt wherein said zinc in a volatile state is in said atmosphere;

(c) maintaining said atmosphere at a temperature above 1000° C. and at a volume ratio of $CO_2:CO$ below 0.3; and (d) condensing and recovering said zinc from said atmosphere.

20. The process of claim 19 wherein the carbonaceous binder is selected from the group consisting of tall oil pitch and petrol pitch.

* * * * *

UNITED STATES PATENT AND TRADEMARK OFFICE
CERTIFICATE OF CORRECTION

PATENT NO. : 5,188,658
DATED : February 23, 1993
INVENTOR(S) : Jan A. Aune et al.

It is certified that error appears in the above-identified patent and that said Letters Patent is hereby corrected as shown below:

Column 4, line 38, change "zince" to --zinc--.

Column 6, line 46 (claim 2), delete "is" (first instance).

Column 6, line 49 (claim 3), after "atmosphere" insert --is--.

Signed and Sealed this

Ninth Day of November, 1993

Attest:

BRUCE LEHMAN

Attesting Officer

Commissioner of Patents and Trademarks